United States Patent
Allen et al.

(10) Patent No.: US 9,679,158 B2
(45) Date of Patent: *Jun. 13, 2017

(54) LIMITING EXPOSURE TO COMPLIANCE AND RISK IN A CLOUD ENVIRONMENT

(71) Applicant: International Business Machines Corporation, Armonk, NY (US)

(72) Inventors: Corville O. Allen, Morrisville, NC (US); Arthur R. Francis, Raleigh, NC (US); Eduardo A. Patrocinio, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,819

(22) Filed: Aug. 24, 2015

(65) Prior Publication Data

US 2016/0196446 A1    Jul. 7, 2016

Related U.S. Application Data

(63) Continuation of application No. 14/591,578, filed on Jan. 7, 2015.

(51) Int. Cl.
*G06F 21/62* (2013.01)
*H04L 29/08* (2006.01)
*H04L 29/06* (2006.01)
*H04L 9/08* (2006.01)

(52) U.S. Cl.
CPC .......... *G06F 21/6245* (2013.01); *H04L 63/10* (2013.01); *H04L 67/1097* (2013.01); *G06F 21/6227* (2013.01); *H04L 9/085* (2013.01)

(58) Field of Classification Search
CPC .. H04L 67/1097; H04L 9/085; G06F 21/6227
See application file for complete search history.

(56) References Cited

U.S. PATENT DOCUMENTS

| | | | | |
|---|---|---|---|---|
| 7,263,588 | B1 * | 8/2007 | Moritz | G06F 21/6227 707/999.01 |
| 7,818,795 | B1 * | 10/2010 | Arad | H04L 63/1408 726/13 |
| 7,826,470 | B1 * | 11/2010 | Aloni | H04L 49/90 370/419 |

(Continued)

OTHER PUBLICATIONS

Common Ports; retreived from http://packetlife.net/media/library/23/common_ports.pdf on Sep. 28, 2016; wayback archive dat of May 13, 2014.*

(Continued)

*Primary Examiner* — James Turchen
(74) *Attorney, Agent, or Firm* — Scully, Scott, Murphy & Presser, P.C.

(57) ABSTRACT

Minimizing data security risks may be provided. A number and type of confidential data in a computing environment may be determined to generate a metric for the type of confidential data in the computing environment. The metric of the type of confidential data may be compared to a predetermined metric for the type. Responsive to determining the metric for the type of confidential data exceeding a predetermined metric for the type, an action may be performed to prevent more entries of the type of confidential data in the computing environment.

9 Claims, 4 Drawing Sheets

(56) References Cited

U.S. PATENT DOCUMENTS

| | | | | |
|---|---|---|---|---|
| 7,860,006 | B1* | 12/2010 | Kashyap | H04L 41/0893 370/235 |
| 7,890,748 | B1 | 2/2011 | Wyatt | |
| 8,046,378 | B1* | 10/2011 | Zhuge | G06F 17/30082 707/783 |
| 8,078,903 | B1* | 12/2011 | Parthasarathy | H04L 63/0428 380/278 |
| 8,131,784 | B1* | 3/2012 | Zhuge | G06F 17/30073 707/823 |
| 8,347,380 | B1* | 1/2013 | Satish | G06F 11/00 708/200 |
| 8,812,727 | B1* | 8/2014 | Sorenson, III | H04L 47/70 709/219 |
| 8,849,716 | B1* | 9/2014 | Everhart | G06F 21/6245 705/1.1 |
| 9,055,076 | B1* | 6/2015 | Sorenson, III | H04L 67/1008 |
| 9,288,184 | B1* | 3/2016 | Kvamme | H04L 63/0227 |
| 2005/0216428 | A1* | 9/2005 | Yagawa | G06F 17/30215 |
| 2006/0048142 | A1* | 3/2006 | Roese | H04L 41/0893 717/176 |
| 2008/0022136 | A1* | 1/2008 | Mattsson | G06F 21/6227 713/194 |
| 2008/0195965 | A1* | 8/2008 | Pomerantz | G06F 19/322 715/780 |
| 2009/0019251 | A1* | 1/2009 | Helman | G06F 17/30138 711/171 |
| 2009/0037200 | A1 | 2/2009 | Hardy et al. | |
| 2009/0119768 | A1* | 5/2009 | Walters | H04L 63/0245 726/12 |
| 2009/0300759 | A1* | 12/2009 | Wang | H04L 63/101 726/22 |
| 2010/0097945 | A1* | 4/2010 | Raftelis | H04L 63/1441 370/252 |
| 2010/0175136 | A1* | 7/2010 | Frumer | G06F 21/31 726/26 |
| 2010/0235410 | A1* | 9/2010 | Apacible | G06F 21/6218 707/812 |
| 2011/0196664 | A1* | 8/2011 | Zunger | G06F 17/30215 703/21 |
| 2011/0286595 | A1* | 11/2011 | Resch | H04L 9/085 380/46 |
| 2011/0320469 | A1* | 12/2011 | Canessa | G06F 17/3028 707/758 |
| 2012/0066490 | A1* | 3/2012 | Sato | H04L 9/0877 713/153 |
| 2012/0072985 | A1 | 3/2012 | Davne et al. | |
| 2012/0303558 | A1* | 11/2012 | Jaiswal | G06N 99/005 706/12 |
| 2013/0304761 | A1 | 11/2013 | Redlich et al. | |
| 2013/0335233 | A1* | 12/2013 | Kamar | A61B 5/0002 340/870.01 |
| 2014/0006350 | A1* | 1/2014 | Fukui | G06F 17/30377 707/632 |
| 2014/0059355 | A1* | 2/2014 | Schuette | G06F 21/6218 713/189 |
| 2014/0351878 | A1* | 11/2014 | Zegman | H04L 63/0227 726/1 |
| 2014/0365680 | A1* | 12/2014 | van Bemmel | H04L 29/06 709/232 |
| 2014/0372607 | A1* | 12/2014 | Gladwin | H04L 67/16 709/224 |
| 2015/0066538 | A1* | 3/2015 | Dantsker | G06F 19/3406 705/3 |
| 2015/0154778 | A1* | 6/2015 | Hughes | G06F 19/321 345/629 |
| 2015/0248253 | A1* | 9/2015 | Kim | G06F 3/0611 707/723 |
| 2015/0281085 | A1* | 10/2015 | Phaal | H04L 47/12 370/235 |
| 2016/0021186 | A1* | 1/2016 | De Sene | H04L 67/1097 709/213 |
| 2016/0196446 | A1* | 7/2016 | Allen | H04L 63/10 726/1 |

OTHER PUBLICATIONS

Taking Account of Privacy when Designing Cloud Computing Services; Siani Pearson; 2009 Hewlett-Packard Development Company, L.P.*

"HIPAA Violations and Enforcement", printed on Dec. 19, 2014, 2 pages, http://www.ama-assn.org//ama/pub/physician-resources/solutions-managing-your-practice/coding-billing-insurance/hipaahealth-insurance-portability-accountability-act/hipaa-violations-enforcement.page.

Wikipedia, "Protected health information", last modified Jun. 12, 2014, 3 pages, http://en.wikipedia.org/wiki/Protected_health_information.

"Types of Restricted Data", printed on Dec. 19, 2014, 4 pages, http://its.ucsc.edu/security/training/restricted.html.

Wikipedia, "Load balancing (computing)", last modified Dec. 9, 2014, 8 pages, http://en.wikipedia.org/wiki/Load_balancing_%28computing%29.

"What is a HIPAA Violation?", printed on Dec. 19, 2014, 2 pages, http://www.onlinetech.com/compliant-hosting/hipaa-compliant-hosting/resources/what-is-a-hipaa-violation.

U.S. Department of Health & Human Services, "Health Information Privacy Enforcement Rule—Final Rule", Federal Register, Feb. 16, 2006, 64 pages, vol. 71, No. 32, http://www.hhs.gov/ocr/privacy/hipaa/administrative/enforcementrule/enforcementfinalrule.html.

Tang, Yang et al., "CleanOS: Limiting Mobile Data Exposure with Idle Eviction", Presented as part of the 10th USENIX Symposium on Operating Systems Design and Implementation (OSOi 12), Oct. 2012, pp. 1-15.

Office Action dated Apr. 26, 2016 received in U.S. Appl. No. 14/591,578, 10 pages.

Karagiannis, T., et al., "BLINC: Multilevel Traffic Classification in the Dark", ACM SIGCOMM Computer Communication Review 2005, Aug. 22-25, 2005, pp. 229-240, vol. 35, No. 4.

Office Action dated Oct. 6, 2016 received in parent U.S. Appl. No. 14/591,578, 16 pages.

* cited by examiner

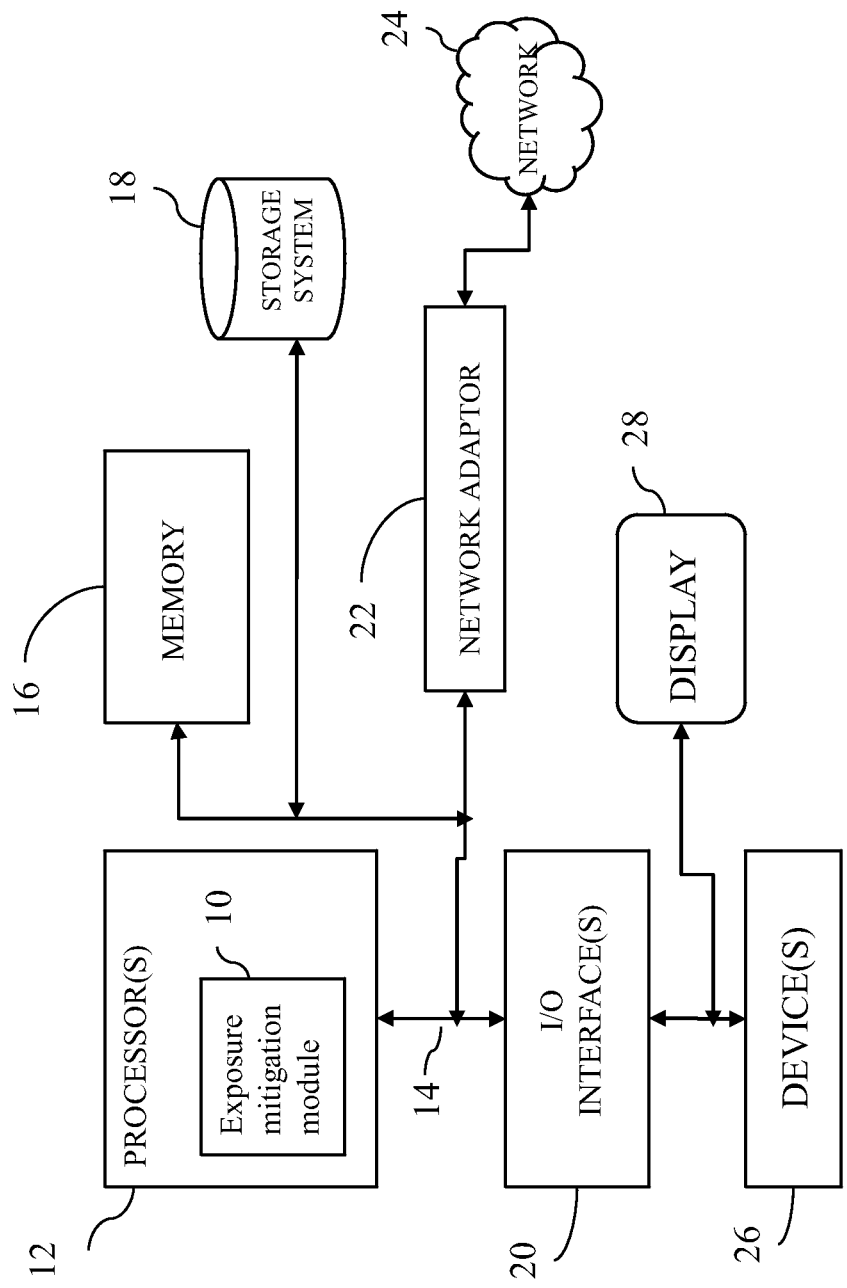

LIMITING EXPOSURE TO COMPLIANCE AND RISK IN A CLOUD ENVIRONMENT

FIELD

The present application relates generally to computers and computer applications, and more particularly to mitigating data breach and/or providing more robust data security in a computing environment.

BACKGROUND

As organizations or companies are embracing the cloud to host their computer applications, the fact these applications are running outside the control of the organization and in a shared environment introduces a risk of data violation. However, organizations are still responsible for meeting all privacy compliances, like Health Insurance Portability and Accountability Act (HIPAA), even when their applications are hosted outside the organization's data center. Many compliances rules impose a hefty and non-linear penalty based on the amount of the data that is exposed. For example, as the amount of data that is exposes gets larger, the amount of penalty cost may grow exponentially.

BRIEF SUMMARY

A method of minimizing data security risks in a computing environment may be provided. The method, in one aspect, may comprise determining a number and type of confidential data in a computing environment to generate a metric for the type of confidential data in the computing environment. The method may also comprise comparing the metric of the type of confidential data to a predetermined metric for the type. The method may further comprise, responsive to determining the metric for the type of confidential data exceeding a predetermined metric for the type, performing an action to prevent more entries of the type of confidential data in the computing environment.

A system for minimizing data security risks, in one aspect, may comprise one or more computing units running in a computing environment and a processor coupled to the one or more computing units. The processor may be operable to determine a number and type of confidential data in the computing environment to generate a metric for the type of confidential data in the computing environment. The processor may be further operable to compare the metric of the type of confidential data to a predetermined metric for the type, and responsive to determining the metric for the type of confidential data exceeding a predetermined metric for the type, the processor may be further operable to perform an action to prevent more entries of the type of confidential data in the computing environment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 illustrates a schematic of an example computer or processing system that may implement a system for mitigating data exposure in one embodiment of the present disclosure.

DETAILED DESCRIPTION

Figure 1:
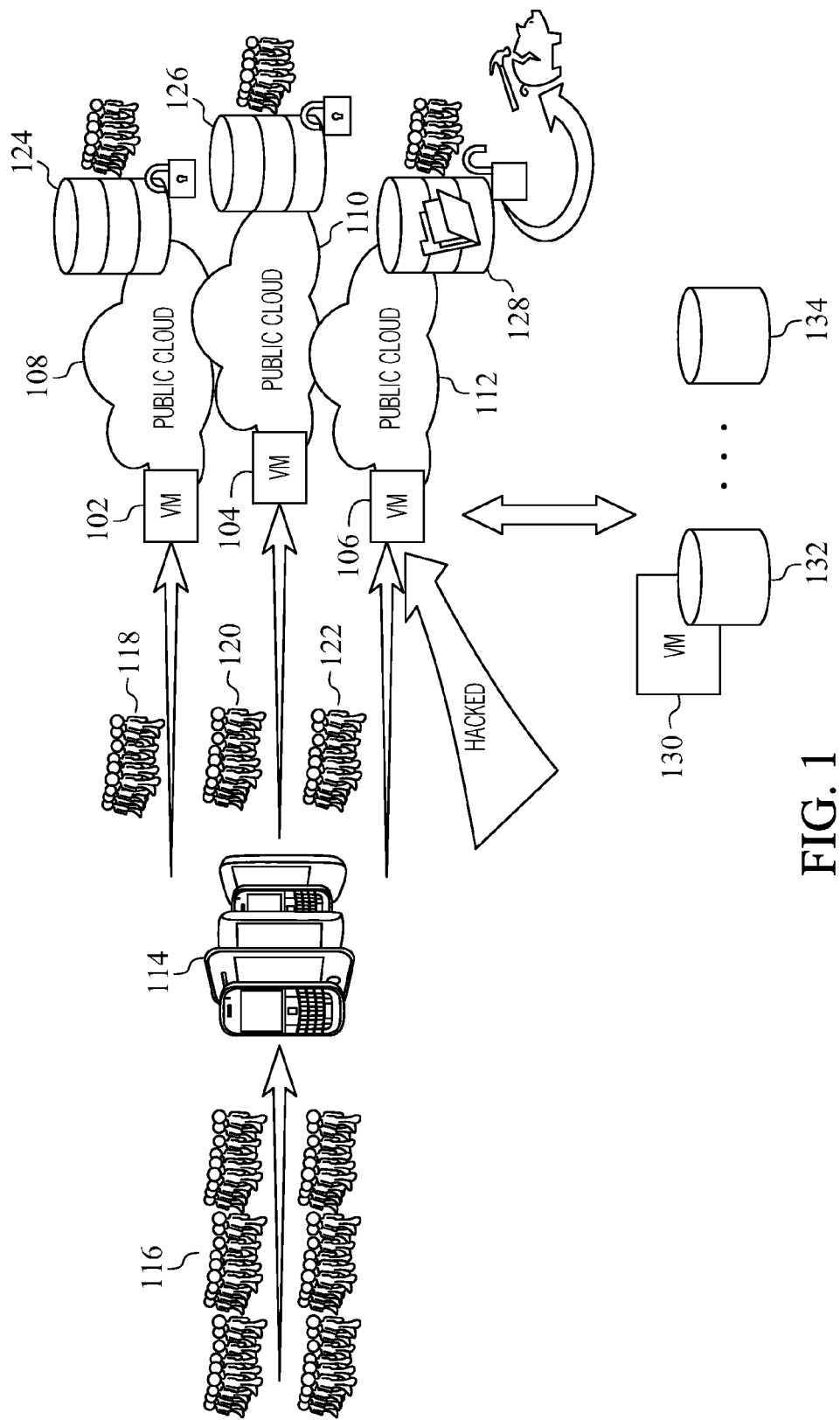
FIG. 1 is a diagram illustrating distribution of data among different machines in one embodiment of the present disclosure.

Techniques are presented that minimize the risk of exposure of data, and for example, to meet data compliancy requirements. In one embodiment, a methodology of the present disclosure may spread a workload through different compute resources in different hardware. For instance, a compute node, like a virtual machine (VM), may be configured to process the data for up to a defined number of units, for instance, even if that machine or compute node has the capacity to process more data. In addition, to minimize the risk of multiple compute resources being compromised, a methodology of the present disclosure in one embodiment may spread the workload through different independent hardware.

For example, a methodology of the present disclosure may limit the exposure based on policy guidelines, e.g., HIPAA policy guidelines, for data in a single VM by distributing the number and type of confidential data that is on any single VM at any time. This may be accomplished by distributing the work load based on the policy of users and data types across different virtual machines (VMs) on different hosts and dynamically reducing the number of data points in a single virtual machine. The methodology in one embodiment may also control the total number of critical data points across the VMs collectively on a single provider.

The methodology of the present disclosure allows for limiting the exposure of the confidential data if a single system gets breached, and limiting the penalty such as fines for policy violations such as a HIPAA violation on the covered entities (e.g., both client and the provider). In addition, the methodology of the present disclosure may allow for the service (e.g., the provider of the infrastructure for service) to reduce its exposure and the fine since the service will only process a set amount of content at any given time, and dynamically delete or reduce the number of confidential data being processed.

For example, the methodology of the present disclosure in one embodiment reduces risk to exposure of confidential data in a cloud environment by distributing the resources to mitigate and reduce risk, for example, by data type and content.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessnesss, low coupling, modularity, and semantic interoperability. At the heart of cloud computing is an infrastructure comprising a network of interconnected nodes. It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

FIG. 1 is a diagram illustrating distribution of data among different machines in one embodiment of the present disclosure. Data may be distributed among a plurality of virtual machines (e.g., 102, 104, 106) on different hardware (e.g., 108, 110, 112). It is noted that while FIG. 1 shows a "public cloud" that might include a compute unit such as a virtual machine and/or a cloud service as an example for illustrative purposes, it should be understood that any other hardware or computing environment may apply. Thus components 108, 110 and 112 are not limited only a "public cloud." Users 116 may access data via their devices (e.g., 114). For example, via the devices (e.g., 114) a user may run an application on a virtual machine or interface with a cloud service that involves accessing and working on the data. A methodology of the present disclosure distributes the data access to different virtual machines and hardware. For example, different users (e.g., 118, 120, 122) are directed to different virtual machines (e.g., 102, 104, 106, respectively) and hardware (e.g., 108, 110, 112, respectively). In the event a virtual machine (e.g., 106) is compromised, the data that is exposed may be limited to only the data that is associated with that virtual machine (e.g., 106) and the hardware 112 (e.g., that may include one or more storage devices) associated with that virtual machine.

In one embodiment, a methodology of the present disclosure allows a virtual machine to refuse data if it has reached capacity for confidential data. For example, a virtual machine (e.g., 102) may be configured or programmed to monitor the amount of confidential that it is storing or processing. Once a defined threshold amount is detected, the virtual machine (e.g., 102) may refuse to store or process any further data. The data processing and storage refused by the virtual machine at 102 may be processed and stored by another virtual machine (e.g., 104) at another hardware (e.g., 110).

In another embodiment, a service enabled in a cloud environment on a virtual machine may limit the use of its service when a threshold for data and type is reached by throwing an exception or providing an error code that prevents any further data from being stored and providing the functionality.

In another aspect, the virtual machine (e.g., 102) may be configured or programmed to reduce the data that it is handling to a compliance level. The virtual machine may have a storage device attached which stores the data as part of the cloud system. The virtual machine may begin off-loading some of the data associated with the compliance metric to an alternate storage device on a different hardware that would not be subject to compromise and/or another virtual machine whose metrics (e.g., count, volume, another metric) is below a threshold metric. After the data has been reduced to an acceptable level, the virtual machine or cloud service can be re-enabled. The virtual machine can begin closing its access ports (hyper text transfer protocol (http)) or refuse service by channeling requests to an alternate system.

In one embodiment, each of the VMs (e.g., 102, 104, or 106) is a separate system, for example, on a separate cloud infrastructure (e.g., 108, 110, 112), with one or more associated storage devices (124, 126, 128). Another separate system 130 with its associated storage 132 on separate hardware may manage the storage (e.g., 124, 126, or 128) and usage of the data (e.g., data points) handled by the virtual machines (e.g., 102, 104, or 106) and so that reducing and eliminating the data can be managed. For example, there may be one or more redundant data stores (e.g., 130, 132, 134) used to perform threshold data management. In one embodiment, the redundant data stores may be identical, or may only be a file storage system or may be a VM not related to servicing data for an application from a requesting device 114, for example, depending on the type of data. For instance, the redundant data stores may include a VM 130 and associated storage 132. The redundant data store may also only include a data storage system 136. If a VM (e.g., 102, 104, or 106) does not use the data constantly, then the data may be moved to an alternate storage medium (e.g., one or more of 130, 132, 134).

For example, software may set up N partitions of defined size (e.g., small to moderate size) to store the confidential data to be worked on. In one embodiment of the present disclosure, the partitions are distributed on multiple machines (e.g., virtual machines and/or multiple hardware) and can be removed or deleted (e.g., from one or more of those virtual machines and/or multiple hardware) on demand to stay within compliance.

In one embodiment of the present disclosure, the one or more metrics, e.g., the amount of data stored or the partition size (e.g., volume) may be determined based on a selected policy. For instance, for meeting HIPAA guidelines for patient data confidentiality, the amount of data or size may be determined based on the number of patients and the type of information held. Other examples of the type of information or data may include, but are not limited to, the number of users or confidential data points, credit card information (e.g., financial information). Address is a type (location information), name (identifying information), social security (identification numbers), whether the data is confidential and restricted. For example, a policy based on a metric may indicate that only 100,000 records with social security numbers can be held; that only 500,000 credit card information can be held, and other polices. Another example may be to limit the number of patient's data in a storage repository to be limited to N number (e.g., 1000) of patients, requiring creation of a cluster of repositories to serve more than that limit (e.g., 1000) patients. In one embodiment, the techniques of the present disclosure implement a mitigation factor, by segregating user's data in different compute resources.

In another embodiment, a dispatcher may be configure or programmed to dispatch queries to the VMs to determine how much confidential data a VM has. A load balancer may be used, for example, where it queries the VMs for their status then reduces traffic or stops traffic to that system once it gets there. For instance, a gateway (e.g., FIG. 2, 204) may include a load balancer or dispatcher. In another embodiment, a dispatcher may be a separate device with a processor that communicates between the gateway (e.g., FIG. 2, 204) and the compute units (202)

Figure 2:
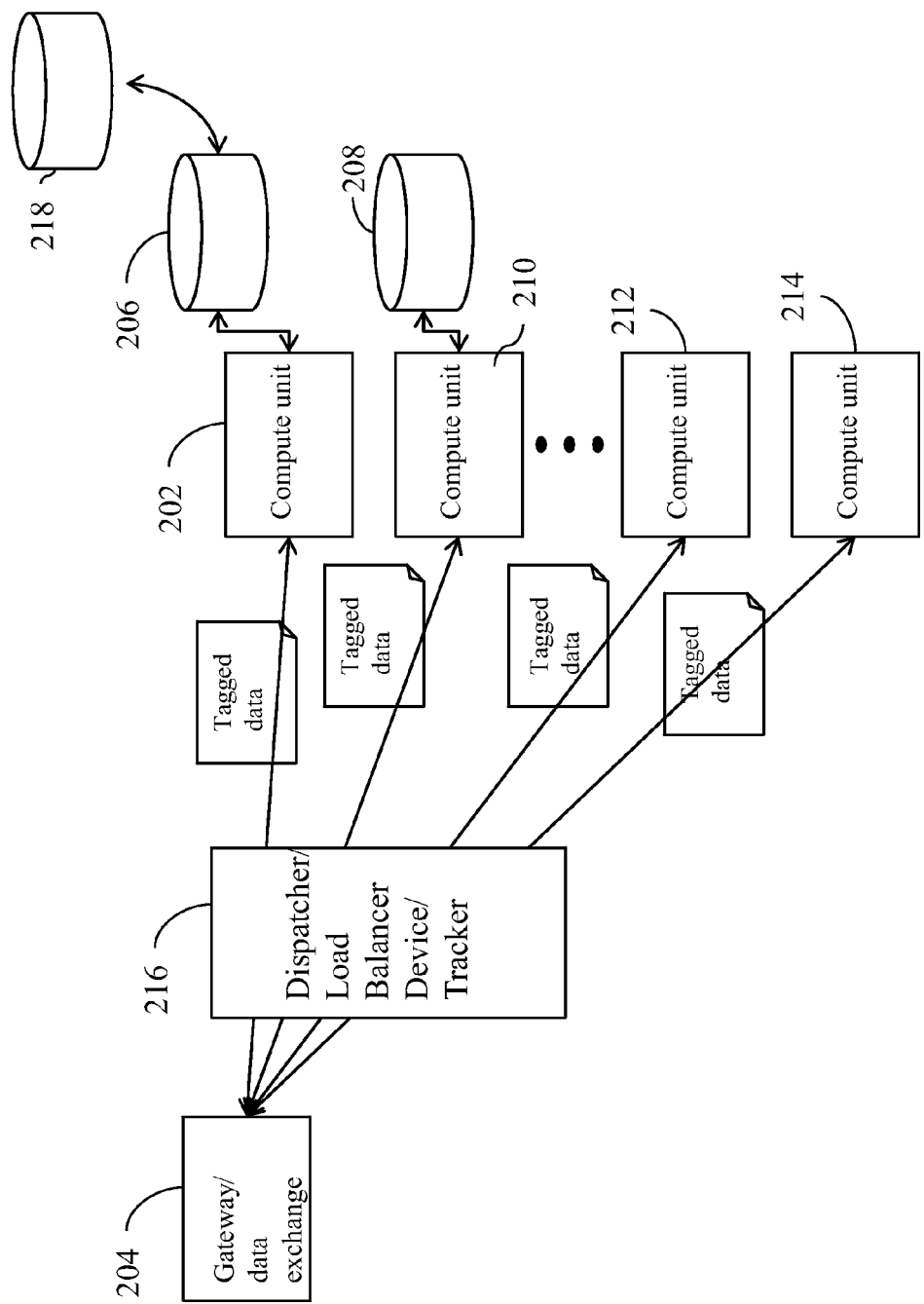
FIG. 2 is another diagram illustrating distribution of data among different machines in one embodiment of the present disclosure.

FIG. 2 is another diagram illustrating distribution of data among different machines in one embodiment of the present disclosure. For example, gateways and data exchange with each compute unit 202, 210, 212, 214 is tagged to illustrate the data type and confidentiality of the data. An example of a compute unit (e.g., 202) may include a virtual machine (e.g., shown in FIG. 1 at 102, 104, 106). Another example of a compute unit (e.g., 210) may include a service on a cloud infrastructure. The number of instances of a data type is tracked as they enter a compute unit (e.g., 202, 210, 212, 214). A tracker or a tracking functionality may keep track of the number of instances of a data type entering a compute unit (e.g., 202). The tracking functionality may reside at the gateway 204, at each compute unit (e.g., 202, 210, 212, 214), or at a special dispatcher device, or another VM or storage system, or combinations thereof. For instance, each compute unit (e.g., 202, 210, 212, 214) may have a tracker or tracking functionality that keeps track of the one or more metrics (e.g., count of data, volume size of data, or another metric) for a type of data it is storing. The gateway 204 and/or the dispatcher 216 may also include a tracking functionality, for example, keep track of which compute unit stores what amount of data of certain type. The compute unit (e.g., 202, 210, 212, 214) refuses work when it reaches a threshold, for example, responsive to determining that a defined threshold amount of this type of data is already being handled by that compute unit 202.

The compute unit (e.g., 202, 210, 212, 214) may perform removal of data after it has finished its "work", for example, if that data is no longer needed. For example, user's data may be stored in a temporary storage (e.g., cache) in the compute unit (e.g., 202, 210, 212, 214), which can be cleaned after the user's session is completed. In one aspect, the cleanup is driven not by resource capacity of a compute unit, but by quantity of user's data. As the amount of data instances and type of data decreases, the compute unit (e.g., 202, 210, 212, 214) may begin to accept data. In another aspect, the compute unit (e.g., 202, 210, 212, 214) may perform removal of data responsive to reaching a threshold, and if the data is no longer needed to perform its processing, e.g., to make room for accepting more requests and data.

In one embodiment, the defined threshold of data for each compute unit (e.g., virtual machine or service) may be designated based on a policy set in an infrastructure that is running the compute unit, e.g., the cloud, e.g., which may be managed by a data power appliance for distribution of work, e.g., in the cloud on each compute unit. A data power appliance may include one or more policies and keep track of what data is stored in which compute unit and by how much. Based on this information and the one or more policies, the data power appliance may perform a load balancing function. For example, if a compute unit's storage of a type of data is exceeding the amount specified by a policy for a type of data, then the data power appliance may direct a user's request to another compute unit that has not yet met its threshold to handle the request instead. A tracker functionality which may be a part of data power appliance may tag the data, for example, with one or more attributes such as the type. In one aspect, a data power appliance may be a dispatcher at 216. In another embodiment, a data power appliance may reside with a gateway 204. A gateway 204 receives a user's request and data associated with that request (user's data), for example, via an application that a user may be running, and routes the request with the user's data to one or more compute units to service the request. The gateway 204 does not store that data, e.g., user's data. In an embodiment, in which a separate dispatcher 216 is provided as a data power appliance, the tracking and load balancing functions may be performed by the dispatcher 216 rather than the gateway 204.

Each compute unit 202 may manage how the data is stored and removed for each threshold. Different types of data may have different thresholds, e.g., a threshold may depend on the type of data. A metric may be measured by count, volume size or storage size. Similarly, a threshold metric may be a threshold count, a threshold size, or another measurement.

In another embodiment, sensitive data removal may be performed. For example, a data storage unit (e.g., 206) may be allocated per each threshold for the compute unit (e.g., 202) to manage and process its data. Responsive to determining that the limit is reached (threshold is met), the compute unit (e.g., 202) may instantiate another data storage unit (e.g., 208), e.g., in another cloud to continue processing data. Then the compute unit (e.g., 202) may trigger a delete or cleanup of the previous data storage unit (e.g., 206). The data storage units (e.g., 206, 208) may be instantiated at different hosts and sites to reduce the possibility of exposure based on the site. In another embodiment, responsive to determining that the limit is reached (threshold is met), the compute unit (e.g., 202) may move its data to another data storage unit (also referred to as a redundant data storage) 218 that is not related to servicing the user's request (e.g., does not have the functionality to service the user's request), but stores data received from the compute unit. As described above, the redundant data storage may include a VM with storage capability, or a data storage system, or another system that can store data.

In one embodiment, each cloud service (e.g., compute unit) that is used may be tagged or acknowledged on the cloud with the data types and protected health information (PHI) status, which may be tracked for threshold and penalty amounts (e.g., fines) on exposure. Briefly, a service on a cloud may have an interface or protocol used to call or run that service. For example, a user via a user device (e.g., in FIG. 1 at 114) may run such a cloud service. As described above, a compute unit (e.g., FIG. 2, 202, 210, 212, 214) may be a service on the cloud. Also as described above, a compute unit (e.g., FIG. 2, 202, 210, 212, 214) may be a VM, for example on a cloud. A service, for example, is software-based, e.g., includes software on a cloud infrastructure. A virtual machine, on the other hand, may be hardware-based, emulates hardware that provides application functionality for user's request.

Figure 3:
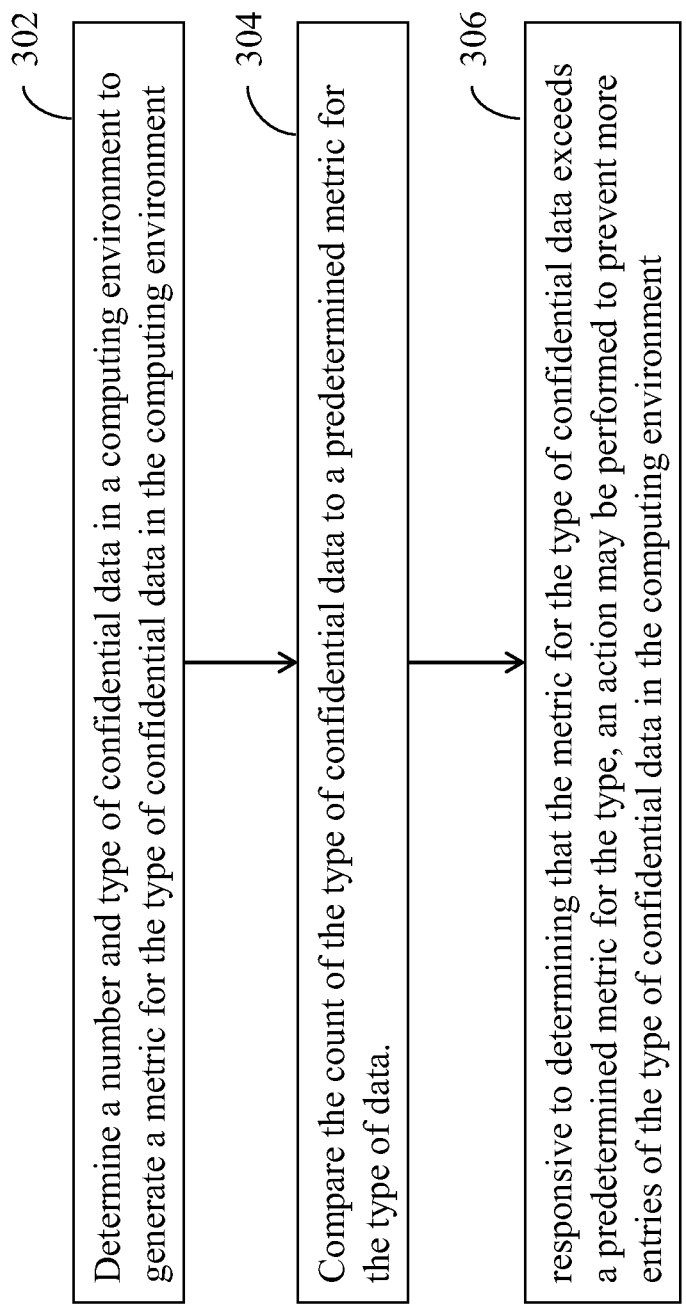
FIG. 3 is a flow diagram illustrating a method of the present disclosure in one embodiment for mitigating data exposure in computing environment.

FIG. 3 is a flow diagram illustrating a method of the present disclosure in one embodiment for mitigating data exposure or minimizing data security risks in a computing environment. At 302, a number and type of confidential data in a computing environment may be determined to generate a metric (e.g., count) for the type of confidential data in the computing environment. For example, a number and type of confidential data in a computing environment may be computed or counted to form a metric for each type of confidential data in the computing environment. Examples of a computing environment may include but are not limited to one or more of a virtual environment, a virtual machine (VM), a logical partition (LPAR), a workload partition (WPAR), a machine, a node, or public cloud, or combinations thereof. Examples of confidential data may include but are not limited to one or more of social security number (SSN), patient data (e.g., health related information), personal information, or credit card number or combinations thereof.

At 304, the metric of the type of confidential data may be compared to a predetermined metric for the type. For example, the metric of each type of confidential data in the computing environment may be compared to a predetermined metric for the each type. The predetermined metric or a threshold value of a type of confidential data may depend on a guideline or policy that is set for processing such type of confidential data. The predetermined metric or the threshold value, and the metric of data in the computing amount may be stored for each of different types of confidential data identified in the computing environment. As more data of each of different type of confidential data enters the computing environment, the metric associated with that type may be added to the existing metric and the comparison performed.

At 306, responsive to determining that the metric for the type of confidential data exceeds a predetermined metric for the type, an action may be performed to prevent more entries of the type of confidential data in the computing environment. For example, responsive to determining a first metric for a first type exceeding a predetermined metric for the first type, an action may be performed to prevent more entries of the first type in the computing environment. In one aspect, if the metric does not exceed, the data may be allowed to enter the computing environment, and the metric is updated (e.g., count is incremented) to include this new data entry. Data enters the computing environment via an application or protocol or an interface to call or run an application.

Examples of an action may include but are not limited to one or more of pacing, preventing work from entering the computing environment, and/or scheduling work associated with the type of confidential data into a different computing environment. Pacing refers to throttling requests, or slowing down the servicing of the requests. For example, based on the metric a computing environment has reached, the computing environment may decide to service only every X number of requests, for every 10 requests, service 1 request and redirect the rest of the 9 requests to another computing environment, for example, another virtual machine or a cloud service.

FIG. 4 illustrates a schematic of an example computer or processing system that may implement a system for mitigating data exposure in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of minimizing data security risks, comprising:
    determining a number and type of confidential data stored in a computing environment to generate a metric for the type of confidential data in the computing environment, the type of confidential data determined from a plurality of types comprising at least social security number (SSN), patient data, personal information, and credit card number;
    comparing the metric of the type of confidential data to a predetermined threshold for the type; and
    responsive to determining the metric for the type of confidential data exceeding a predetermined threshold for the type, performing an action to prevent more entries of the type of confidential data to be stored in the computing environment,
    the metric measured by at least one of a count of the type of confidential data in the computing environment and a volume size taken up by the type of confidential data in the computing environment,
    the predetermined threshold being different for different types of confidential data in the computing environment,
    the performing an action to prevent more entries of the type of confidential data in the computing environment comprising closing an access port in the computing environment to requests associated with new data of the type of confidential data, and automatically performing removal of data of the type stored in the computing environment to make room for accepting said more entries of the type of confidential data.

2. The method of claim 1, wherein the action comprises at least one of pacing and preventing work from entering the computing environment.

3. The method of claim 1, wherein the action comprises scheduling work associated with the type of confidential data into a different computing environment.

4. The method of claim 1, wherein the computing environment comprises one or more of a virtual environment, a virtual machine (VM), a logical partition (LPAR), a workload partition (WPAR), a machine, a node, or public cloud, or combinations thereof.

5. The method of claim 1, wherein the predetermined metric is configured based on a policy that is set for processing the type of confidential data.

6. The method of claim 1, wherein the type of confidential data comprises social security number, wherein responsive to determining that the metric associated with the data comprising social security number meets the predetermined threshold for the type of confidential data, the predetermined threshold defined as a count of the social security number, preventing the computing environment from servicing requests associated with new data having the type of confidential data.

7. The method of claim 1, wherein the type of confidential data comprises patient data, wherein responsive to determining that the metric associated with the data comprising patient data meets the predetermined threshold for the type of confidential data, the predetermined threshold defined as a count of the patient data, preventing the computing environment from servicing requests associated with new data having the type of confidential data.

8. The method of claim 1, wherein the type of confidential data comprises personal information, wherein responsive to determining that the metric associated with the data comprising personal information meets the predetermined threshold for the type of confidential data, the predetermined threshold defined as a count of the personal information, preventing the computing environment from servicing requests associated with new data having the type of confidential data.

9. The method of claim 1, wherein the type of confidential data comprises credit card information, wherein responsive to determining that the metric associated with the data comprising credit card information meets the predetermined threshold for the type of confidential data, the predetermined threshold defined as a count of the credit card information, preventing the computing environment from servicing requests associated with new data having the type of confidential data.

* * * * *